(12) United States Patent
Brandin

(10) Patent No.: US 10,053,067 B2
(45) Date of Patent: Aug. 21, 2018

(54) VEHICLE SAFETY ASSIST SYSTEM

(71) Applicant: VOLVO CAR CORPORATION, Gothenburg (SE)

(72) Inventor: Magnus Brandin, Molnlycke (SE)

(73) Assignee: Volvo Car Corporation, Gothenburg (SE)

( * ) Notice: Subject to any disclaimer, the term of this patent is extended or adjusted under 35 U.S.C. 154(b) by 23 days.

(21) Appl. No.: 15/409,937

(22) Filed: Jan. 19, 2017

(65) Prior Publication Data
US 2017/0210359 A1 Jul. 27, 2017

(30) Foreign Application Priority Data

Jan. 21, 2016 (EP) ..................................... 16152259

(51) Int. Cl.
*B60W 10/00* (2006.01)
*B60W 10/18* (2012.01)
(Continued)

(52) U.S. Cl.
CPC .............. *B60T 7/22* (2013.01); *B60W 10/18* (2013.01); *B60W 30/09* (2013.01); *B60W 50/14* (2013.01);
(Continued)

(58) Field of Classification Search
CPC ...... B60W 10/00; B60W 10/18; B60W 30/00; B60W 30/09; B60W 50/00; B60W 50/14; B60T 7/22; G08G 1/166
See application file for complete search history.

(56) References Cited

U.S. PATENT DOCUMENTS

| | | | |
|---|---|---|---|
| 6,944,543 B2 * | 9/2005 | Prakah-Asante | B60R 21/013 180/167 |
| 7,565,242 B2 | 7/2009 | Lucas et al. | |

(Continued)

FOREIGN PATENT DOCUMENTS

| | | |
|---|---|---|
| CN | 104773177 A | 7/2015 |
| DE | 102008002576 | 12/2009 |

(Continued)

OTHER PUBLICATIONS

European Search Report for EP 16152259.4 and Written Opinion all together 5 Pages.

(Continued)

*Primary Examiner* — Yonel Beaulieu
(74) *Attorney, Agent, or Firm* — Brooks Kushman P.C.

(57) ABSTRACT

A vehicle safety assist system is configured to detect vehicles travelling ahead of a host vehicle and determine a relative kinematic property between a detected vehicle and the host vehicle and a relative kinematic property reliability measure indicative of a reliability of the determined relative kinematic property. The system is also configured, on the basis of host vehicle state information, a number of detected vehicles, the relative kinematic property and the reliability of the relative kinematic property of each detected vehicle, determine a host vehicle impact consequence level and an impact consequence level reliability measure indicative of a reliability of the determined host vehicle impact consequence level. On the basis of the host vehicle impact consequence level and the impact consequence level reliability measure, the system is further configured to determine whether the vehicle safety assist system should issue a warning signal and/or an autonomous braking signal.

25 Claims, 9 Drawing Sheets

(51) Int. Cl.
*B60W 30/00* (2006.01)
*B60W 30/09* (2012.01)
*G08G 1/16* (2006.01)
*B60T 7/00* (2006.01)
*B60T 7/22* (2006.01)
*B60W 50/14* (2012.01)
*B60W 50/02* (2012.01)

(52) U.S. Cl.
CPC ..... *G08G 1/166* (2013.01); *B60W 2050/0215* (2013.01); *B60W 2420/403* (2013.01); *B60W 2420/52* (2013.01); *B60W 2520/10* (2013.01); *B60W 2520/105* (2013.01); *B60W 2550/10* (2013.01); *B60W 2550/141* (2013.01); *B60W 2550/30* (2013.01)

(56) References Cited

U.S. PATENT DOCUMENTS

| | | | |
|---|---|---|---|
| 9,079,571 B2 | 7/2015 | Trost et al. | |
| 9,187,091 B2* | 11/2015 | Mills | B60W 40/107 |
| 9,481,365 B2* | 11/2016 | Tokoro | B60W 30/09 |
| 9,669,826 B2* | 6/2017 | Igarashi | B60W 30/08 |
| 9,682,703 B2* | 6/2017 | Okita | B60T 8/17558 |
| 2004/0061598 A1 | 4/2004 | King | |
| 2009/0076702 A1 | 3/2009 | Arbitmann et al. | |
| 2010/0114490 A1* | 5/2010 | Becker | B60W 30/16 701/301 |
| 2014/0032093 A1* | 1/2014 | Mills | B60W 40/107 701/301 |
| 2014/0136044 A1 | 5/2014 | Conrad | |
| 2015/0151748 A1 | 6/2015 | Benmimoun et al. | |
| 2015/0288948 A1* | 10/2015 | Schamp | H04N 13/025 13/25 |

FOREIGN PATENT DOCUMENTS

| | | |
|---|---|---|
| DE | 102010049351 | 4/2012 |
| DE | 102012000813 | 9/2012 |
| DE | 102013224508 | 6/2015 |
| EP | 1625979 | 2/2006 |
| EP | 2405416 | 1/2012 |
| EP | 2803546 | 11/2014 |
| JP | 2012048643 | 3/2012 |
| WO | 2006052699 A1 | 5/2006 |

OTHER PUBLICATIONS

Extended European Search Report and Written Opinion for related European Patent Application No. 17152078, dated Jul. 24, 2017, 7 pages.

* cited by examiner

VEHICLE SAFETY ASSIST SYSTEM

CROSS-REFERENCE TO RELATED APPLICATIONS

This application claims foreign priority benefits under 35 U.S.C. § 119(a)-(d) to European patent application number EP 16152259.4, filed Jan. 21, 2016, which is incorporated by reference in its entirety.

TECHNICAL FIELD

The present disclosure relates to a vehicle safety assist system. The present disclosure further relates to a vehicle safety assist assembly, a vehicle comprising a vehicle safety assist system and a method for providing a driver warning and/or performing autonomous braking

BACKGROUND

Various kinds of systems aim to avoid or mitigate collisions between vehicles or between a vehicle and obstacles in a road environment. For example, a vehicle may be equipped with an auto-braking system which is activated e.g., if a pedestrian suddenly walk out in front of the vehicle. Some vehicle systems allow a host vehicle to follow a preceding vehicle and are configured to slow down the host vehicle by motor braking or by applying vehicle brakes if a velocity of the preceding vehicle is decreased. Such systems may be referred to as a queue assist systems or similar. The above kinds of systems are often configured to avoid or mitigate collisions in scenarios where velocities of the vehicles involved are relatively low, such as velocities usually used in cities.

Some vehicles today are equipped with predictive safety systems or an adaptive cruise control, ACC, system which can control a host vehicle in scenarios where vehicle velocities are higher, such as on motorways and highways. An ACC system may monitor the vehicle surrounding and can determine positions for other vehicles near the host vehicle and/or relative velocities between the host vehicle and surrounding vehicles. Such a system may calculate whether or not there is a risk for collision between the vehicles and can in such case brake the host vehicle and/or warn a host vehicle driver.

EP2405416B1 relates to a vehicle comprising an ACC system with a radar and a camera. The radar can be a long range radar arranged to cover a sector or field ahead of a vehicle comprising the system. The sector to be monitored depends on a host vehicle yaw rate, current trajectory or similar. When vehicles in front of the host vehicle are braked this is detected by the ACC in the host vehicle whereby the host vehicle can be braked. Hereby collisions can be avoided.

The system described in EP2405416B1 can be useful in certain situations, but may be unable to adequately control a host vehicle or assist a host vehicle driver in other situations such as when the host vehicle is driven with high velocity on a highway or similar. Thus, there remains a need for a vehicle system which further decreases a risk of collision between vehicles and/or which mitigates collisions between vehicles.

SUMMARY

It is an object of the present disclosure to provide a vehicle safety assist system eliminating or at least reducing drawbacks and/or limitations associated with prior art solutions.

This may be achieved by the subject-matter of claim 1. Embodiments of claim 1 are set forth in the appended dependent claims, in the following description and in the drawings.

Thus, according to a first embodiment of the present disclosure, there is provided a vehicle safety assist system for a host vehicle, the vehicle safety assist system being adapted to:

receive sensor information from a vehicle long range sensor set comprising at least one long range sensor, the vehicle long range sensor set being adapted to detect vehicles travelling within a sensor coverage area ahead of the host vehicle;

on the basis of the sensor information, determine a set of detected vehicles and, for each detected vehicle, determine a relative kinematic property between the detected vehicle and the host vehicle and also determine a relative kinematic property reliability measure indicative of the reliability of the determined relative kinematic property;

receive host vehicle state information, the host vehicle state information comprising a speed of the host vehicle;

on the basis of at least the host vehicle state information, the number of vehicles in the set of detected vehicles, the relative kinematic property and the reliability of the relative kinematic property of each vehicle in the set of detected vehicles, determine a host vehicle impact consequence level and an impact consequence level reliability measure indicative of the reliability of the determined host vehicle impact consequence level, and on the basis of at least the host vehicle impact consequence level and the impact consequence level reliability measure, determine whether or not the vehicle safety assist system should issue a warning signal and/or an autonomous braking signal.

By having a vehicle safety assist system of the above kind implies at least one advantageous effect. An advantage of a vehicle safety system of the kind disclosed herein may be that the vehicle long range sensor set need not necessarily be restricted to cover a particular sector or area. The limits for detection may be defined by the performance or limitations of the long range sensors themselves, rather than by selected limits of a target selection range, limits of which depend on the heading or similar of the host vehicle. This has the positive effect that preceding vehicles can be detected earlier, as a result of which braking of the host vehicle can be initiated earlier. This is in particular advantageous in situations where the host vehicle is travelling at a high speed, for example, in a situation where preceding vehicles are decelerating and the host vehicle is approaching at high velocity. Such a situation may occur, e.g., at an accident site or in the event of a queue on a highway, freeway, motorway or similar.

The at least one long range sensor of the vehicle long range sensor set is thus arranged to detect or determine vehicles travelling ahead of the host vehicle within a sensor coverage area which can extend beyond and/or outside an ACC target selection range of the host vehicle if the host vehicle is equipped with an ACC system. ACC target selection ranges of today commonly depend on host vehicle yaw rate, trajectory or similar, wherefore it is spatially limited or restricted to cover an area wherein reliable sensor information can be achieved. The long range sensors according to the embodiments herein are arranged to determine position, deceleration or any other detectable information on surrounding vehicles without limitation to such target selection range.

Optionally, the system may be adapted to, on the basis of at least the host vehicle state information and the relative kinematic property of each detected vehicle in the set of detected vehicles, determine the host vehicle impact consequence level, and on the basis of at least the number of detected vehicles in the set of detected vehicles and the reliability of the relative kinematic property of each vehicle in the set of detected vehicles, determine the impact consequence level reliability measure.

The above features imply that the host vehicle impact consequence level as well as the impact consequence level reliability measure may be determined in an appropriate manner.

Optionally, the relative kinematic property may comprise at least one of the following properties: relative distance, relative velocity, relative deceleration and time to collision. Any one of the above properties may be useful when determining the host vehicle impact consequence level and/or the impact consequence level reliability measure.

Optionally, the impact consequence level reliability measure may increase with an increased number of vehicles in the set of detected vehicles. Hereby, making use of aggregated sensor information of all vehicles in the set of detected vehicles may increase the reliability measure as compared to the reliability of the determined relative kinematic property of each detected vehicle. In particular, in cases where sensor signal information for each detected vehicle is considered weak or unreliable, due to a long distance, aggregating or putting together two or more observations may increase the reliability. For instance, increasing the impact consequence level reliability measure with an increased number of vehicles in the set of detected vehicles may be useful in situations in which the hosting vehicle is approaching an aggregation of preceding vehicles, such as a preceding queue or an accident site.

Optionally, the relative kinematic property reliability measure may be dependent on the relative distance between the detected vehicle and the host vehicle. For instance, the farther away from a hosting vehicles the detected vehicle is located, the larger the possibility that the detected vehicle need not constitute a possible threat to the hosting vehicle. For instance, the greater the distance, the larger the possibility that the detected vehicle is traveling in a lane distinct from the lane that the hosting vehicle is intended to follow. Thus, taking the above relative distance into account when determining the relative kinematic property reliability measure may be beneficial for determining the impact consequence level reliability measure.

Optionally, the vehicle safety assist system may be adapted to establish a maximum sensing range of the vehicle long range sensor set, the relative kinematic property reliability measure being dependent on the relative distance and the maximum sensing range. As such, the vehicle safety assist system may take into account that the reliability of the information provided by the vehicle long range sensor set may be reduced towards the limit of the maximum sensing range.

Optionally, the host vehicle impact consequence level may increase with a reduced time to collision. For instance, a short or reduced time to collision may indicate a possibly severe or increasingly severe situation which may be reflected in an increase of the host vehicle impact consequence level. Moreover, a short time to collision implies that the driver is unlikely to avoid a collision manually, as a result of which it may be beneficial to increase the host vehicle impact consequence level.

Optionally, the host vehicle impact consequence level may increase with an increased speed of the host vehicle. For an increased or high speed of the host vehicle, the consequence may be a possibly severe collision which may be reflected in an increase of the host vehicle impact consequence level.

Optionally, the vehicle safety assist system may be adapted to establish a range of possible host vehicle impact consequence levels. The vehicle safety assist system is further adapted to establish an impact consequence level reliability measure range of possible host vehicle impact consequence levels, wherein the vehicle safety assist system is adapted to issue the autonomous braking signal for a first combination of a first subrange set of the range of possible host vehicle impact consequence levels and a first subrange set of the impact consequence level reliability measure range, and issue the warning signal for a second combination of a second subrange set of the range of possible host vehicle impact consequence levels and a second subrange set of the impact consequence level reliability measure range.

The above features enable the vehicle safety assist system to issue different actions, taking into account combinations of possible host vehicle impact consequence level subranges and impact consequence reliability measure subranges, on the basis of the established host vehicle impact consequence level and impact consequence reliability measure.

A focus for the vehicle safety assist system, as described herein, is to avoid or mitigate rear-end collisions between a host vehicle driving at a high or very high velocity and a preceding vehicle which is braking or stopping because of a queue on a motorway or similar. The safety assist system can therefore alternatively be referred to as an emergency brake assist system, a secondary brake assist system or similar.

Optionally, the vehicle safety assist system may be adapted to establish each one of a high level subrange and a lower level subrange of the host vehicle impact consequence levels, the high level subrange having a minimum host vehicle impact consequence level being greater than the minimum host vehicle impact consequence level of the lower level subrange. The vehicle safety assist system is further adapted to associate the high level subrange to a low reliability subrange of the impact consequence level reliability measure range and to associate the lower level subrange to a higher reliability subrange of the impact consequence level reliability measure range, the low reliability subrange having a minimum reliability measure being smaller than the minimum reliability measure of the higher reliability subrange.

For example, a high host vehicle impact consequence level implies that relatively severe expected damage is to be expected. As has been indicated hereinabove, high host vehicle impact consequence level may at least partly be occasioned by a large velocity of the host vehicle. Put differently, a high host vehicle impact consequence level implies that relatively severe future damage is expected, assuming that the conclusions drawn from the information provided by the vehicle long range sensor set is correct. Therefore, in such a situation, even a relatively low probability of an impact consequence level reliability measure may suffice for brake initiation of the host vehicle. This is since the possible severe consequences of an actual future impact are considered to outweigh the possibly undesired consequences of unnecessarily issuing an autonomous braking signal and/or a warning signal. The host vehicle may thus be pre-braked in response to the possibly correct, possibly erroneous information on vehicles of the set of detected vehicles.

On the other hand, for a lower host vehicle impact consequence level, which may be indicative of a less severe possible collision, an autonomous braking signal may be issued only for a high impact consequence reliability measure. For instance, the possibly undesired consequences of unnecessarily issuing an autonomous braking signal and/or a warning signal are considered to outweigh the consequences associated with a lower host vehicle impact consequence level.

Optionally, the vehicle safety assist system may be adapted to establish the first combination of the first subrange set of the range of possible host vehicle impact consequence levels and the first subrange set of the impact consequence level reliability measure range using the high level subrange, the lower level subrange, the higher reliability subrange and the lower reliability subrange.

As a non-limiting example, the first combination may comprise the high level subrange associated with the lower reliability subrange as well as the lower level subrange associated with the higher reliability subrange.

Optionally, the vehicle safety assist system may be adapted to correlate the determined host vehicle impact consequence level to the range of possible host vehicle impact consequence levels. The vehicle safety assist system is further adapted to correlate the determined impact consequence level reliability measure to the range of impact consequence level reliability measures.

Optionally, the vehicle long range sensor set may be constituted by sensors of the same sensor type.

Optionally, the vehicle long range sensor set has a sensing range of at least 200 meters, preferably at least 250 meters. This implies that the limits for detection may be defined by the performance or limitations of the long range sensors themselves, rather than by selected limits of a target selection range, limits which depend on the heading or similar of the host vehicle. This has the positive effect that preceding vehicles can be detected earlier, as a result of which braking and/or warning of the host vehicle can be initiated earlier.

According to a second embodiment of the present disclosure, there is provided a vehicle safety assist assembly comprising a vehicle long range sensor set and a vehicle safety assist system according to the first embodiment of the present disclosure. The vehicle long range sensor set is adapted to be in communication with the vehicle safety assist system.

According to a third embodiment of the present disclosure there is provided a vehicle comprising a vehicle safety assist system according to the first embodiment of the present disclosure and/or a vehicle safety assist assembly according to the second embodiment of the present disclosure.

According to a fourth embodiment of the present disclosure there is provided a method for determining whether or not to issue a warning signal and/or an autonomous braking signal to a host vehicle, wherein the method comprises:

receiving sensor information from a vehicle long range sensor set comprising at least one long range sensor, the vehicle long range sensor set being adapted to detect vehicles travelling within a sensor coverage area ahead of the host vehicle;

on the basis of the sensor information, determining a set of detected vehicles and, for each detected vehicle, determine a relative kinematic property between the detected vehicle and the host vehicle and also determine a relative kinematic property reliability measure indicative of the reliability of the determined relative kinematic property;

receiving host vehicle state information, the host vehicle state information comprising a speed of the host vehicle;

on the basis of at least the host vehicle state information, the number of vehicles in the set of detected vehicles, the relative kinematic property and the reliability of the relative kinematic property of each vehicle in the set of detected vehicles, determining a host vehicle impact consequence level and an impact consequence level reliability measure indicative of the reliability of the determined host vehicle impact consequence level, and on the basis of at least the host vehicle impact consequence level and the impact consequence level reliability measure, determining whether or not the vehicle safety assist system should issue a warning signal and/or an autonomous braking signal.

A fifth embodiment of the present disclosure relates to a vehicle safety assist system comprising: one or more long range sensors arranged to determine vehicles travelling ahead of the host vehicle; a sensor information processor arranged to process sensor information and issue instructions based thereupon and a driver warning and brake control system arranged to selectively provide a driver warning or perform autonomous braking in response to instructions from the sensor information processor, where the one or more long range sensors is/are arranged to determine vehicles travelling within a sensor coverage area ahead of the host vehicle;

the sensor information processor is arranged to determine, from host vehicle velocity sensor data, if the host vehicle is travelling above at least one predetermined threshold velocity;

the sensor information processor is arranged to determine if a relative deceleration of at least one determined vehicle travelling ahead of the host vehicle is above at least one predetermined threshold deceleration and to determine the strength or confidence of this determination;

the driver warning and brake control system is arranged to provide a driver warning or perform autonomous braking in response to instructions from the sensor information processor based on the above determinations.

The one or more long range sensors is/are thus arranged to detect or determine vehicles travelling ahead of the host vehicle within a sensor coverage area which can extend beyond or outside of an ACC-target selection range of the host vehicle if the host vehicle is equipped with an ACC. ACC-target selection ranges of today commonly depend on host vehicle yaw rate, trajectory or similar, wherefore it is spatially limited or restricted to cover an area where reliable sensor information can be achieved. The long range sensors according to the embodiments herein are arranged to determine position, deceleration or any other detectable information on surrounding vehicles without limitation to such target selection range.

For example, if a large relative deceleration is determined, the driver warning and brake control system is arranged to provide a driver warning or perform autonomous braking also in scenarios where sensor detection or determination of the decelerating vehicle(s) ahead is weak or unreliable. Hereby the host vehicle can be "pre-braked" before reliable sensor information, e.g., from an ACC, becomes available. The host vehicle is braked and/or the driver is warned, "just in case" if the host vehicle is driven fast and it is determined that one or more vehicles is/are decelerating at a large distance ahead of the host vehicle, outside a normal ACC-selection range. During simulations and tests this pre-braking has proven to be useful for decreasing the host vehicle down to velocities where an ACC possibly can take over and control the host vehicle in dependence of other vehicles. Safety is hereby increased and collisions can be avoided or mitigated.

In some embodiments the host vehicle comprises an adaptive cruise control system having an adaptive cruise control system target selection range. The long range sensor or sensors can then be arranged to determine vehicles travelling within a sensor coverage area ahead of the host vehicle outside of the adaptive cruise control system target selection range of the host vehicle.

According to some embodiments the driver warning and brake control system is arranged to provide a driver warning or perform autonomous braking if the strength or confidence of the determined relative deceleration of at least one determined vehicle travelling ahead of the host vehicle is below a threshold strength or confidence. Hereby the vehicle safety assist system can brake the host vehicle and/or warn the driver also in a scenario or situation where the information on other vehicles is relatively unreliable. Any inconvenience caused by unnecessary braking/warnings is outweighed by the increased safety stemming from the braking/warnings in situations where they are necessary.

According to some embodiments the driver warning and brake control system is arranged to postpone a driver warning or autonomous braking until the strength or confidence of the relative deceleration determination reaches a threshold strength or confidence. This is advantageous for example in a situation where the host vehicle velocity is such that the host vehicle still can be braked sufficiently for avoiding a collision with the vehicle(s) ahead. In other words, in some situations an initial braking of e.g., 3 m/s² based on relatively uncertain sensor information is replaced by a somewhat later braking of e.g., 5 m/s² if more reliable sensor information indicates that braking is still necessary.

According to some embodiments the driver warning and brake control system is arranged to provide a driver warning or perform autonomous braking if a number of available upcoming driving lanes for the host vehicle is below a threshold number of lanes. For example, the driver warning and brake control system can be arranged to provide a driver warning or perform autonomous braking earlier in a situation where only one upcoming lane is available for the host vehicle as compared with a situation in which e.g., two, three or four lanes are available. With more lanes available the host vehicle can avoid colliding with a preceding vehicle by a lane change. Upcoming lane availability can be determined e.g., by host vehicle sensors and/or map data stored in the host vehicle or communicated from a map database or similar.

According to some embodiments the driver warning and brake control system is arranged to postpone a driver warning or autonomous braking if a number of available upcoming driving lanes for the host vehicle is at least a threshold number of lanes. The braking/warning can be postponed e.g., one or a few seconds, until more reliable preceding vehicle information is available.

According to some embodiments the sensor information processor is arranged to determine a probability that the host vehicle and a determined vehicle ahead of the host vehicle will become positioned within a predetermined distance from each other and to control the driver warning and brake control system to provide a driver warning or perform autonomous braking in response to the determined probability. The predetermined distance may be referred to as a safety distance between the host vehicle and a detected/determined vehicle. This predetermined distance may be set as a function of the velocity of the host vehicle.

Embodiments herein also aim to provide a vehicle comprising a vehicle safety assist system without the problems or drawbacks described above.

According to some embodiments, this is provided by a vehicle comprising a vehicle safety assist system according to embodiments disclosed herein.

Embodiments herein also aim to provide a method for providing a driver warning or performing autonomous braking of a host vehicle without the problems or drawbacks described above.

According to some embodiments, this is provided by a method for providing a driver warning or performing autonomous braking of a host vehicle comprising a vehicle safety assist system, the vehicle safety assist system comprising: one or more long range sensors arranged to determine vehicles travelling ahead of the host vehicle; a sensor information processor arranged to process sensor information and issue instructions based thereupon and a driver warning and brake control system arranged to selectively provide a driver warning or perform autonomous braking in response to instructions from the sensor information processor, which method comprises determining, by the one or more long range sensors vehicles travelling within a sensor coverage area ahead of the host vehicle;

determining, by the sensor information, from host vehicle velocity sensor data, if the host vehicle is travelling above at least one predetermined threshold velocity;

determining, by the the sensor information processor, if a relative deceleration of at least one determined vehicle travelling ahead of the host vehicle is above at least one predetermined threshold deceleration and to determine the strength or confidence of this determination;

providing a driver warning or performing autonomous braking, by the driver warning and brake control system, in response to instructions from the sensor information processor based on the above determinations.

Since the method comprises the steps of determining vehicles travelling within a sensor coverage area ahead of the host vehicle, possibly outside any ACC-system target selection range of the host vehicle, host vehicle velocity, relative deceleration and the strength or confidence of this sensor determination and providing a driver warning and/or braking, safety is enhanced.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope thereof, as defined by the appended claims. Details from two or more of the embodiments may be combined with each other.

Figure 1:
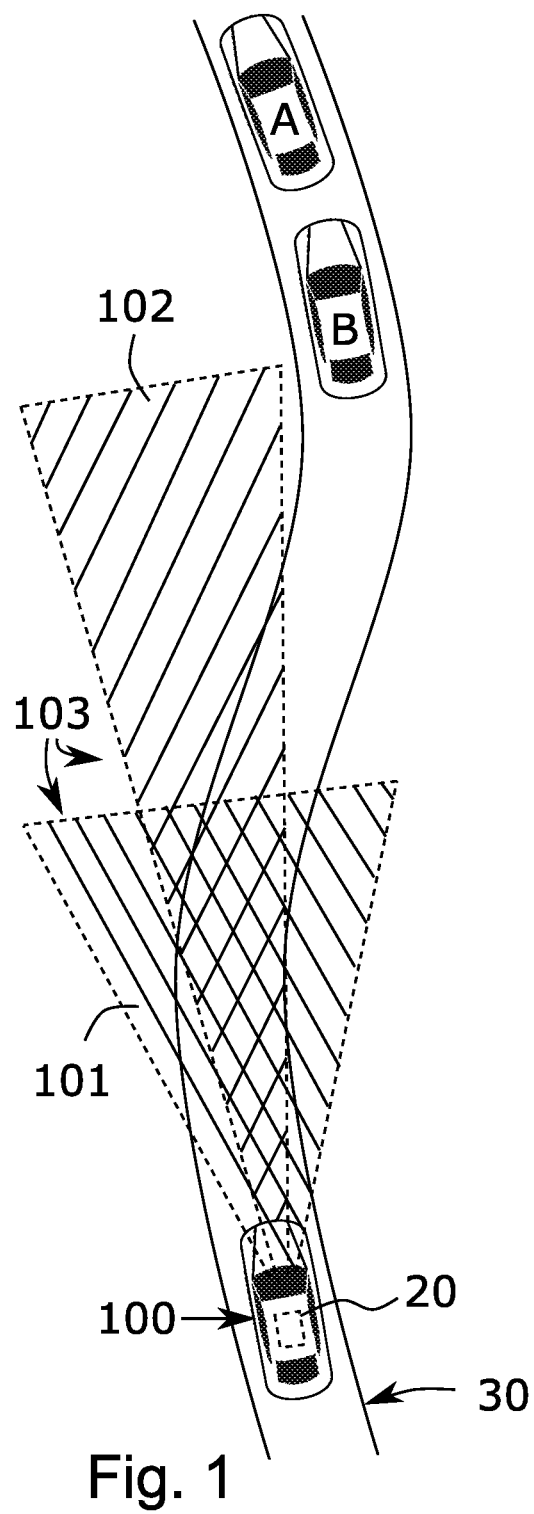
FIG. 1 illustrates a prior art vehicle with an ACC in a road scenario.

FIG. 1 illustrates a vehicle 100 according to the state of the art. The vehicle 100 comprises an adaptive cruise control system, ACC, 20. Such an ACC is configured to control a velocity of the vehicle 100 and to adapt the velocity of the vehicle 100 to velocities of preceding vehicles. The ACC may, for example, motor-brake or activate vehicle brakes such that the vehicle 100 is decelerated from a target velocity if the vehicle 100 catches up a slower preceding vehicle. If a driver of the vehicle 100 changes lane, the ACC may accelerate the vehicle 100 up to the target velocity again. The vehicle 100 is driven on a road 30.

In order to control the velocity of the host vehicle 100 the ACC 20 can comprise one or more sensors. The sensor(s) can be e.g., camera sensors and/or radar sensors. The ACC depicted in FIG. 1 comprises a camera sensor arranged to cover a first target selection range 101 and a radar sensor arranged to cover a second target selection range 102. Generally, a camera sensor is good at detecting vehicles, road signs, road lanes etc. relatively near the vehicle 100. A radar sensor can be better at detecting vehicles and other objects at a larger distance from the vehicle 100.

The combination of camera sensor(s) and radar sensor(s) can, at least in some situations, provide useful and relatively reliable information e.g., on surrounding vehicles to the ACC 20 such that the ACC 20 can control the vehicle 100 in response to the received information.

In FIG. 1 the total area or field covered by the sensors of the ACC 20 is illustrated as an ACC-target selection range 103. A direction of the ACC-target selection range 103 depends on a heading, yaw rate or expected upcoming driving path of the vehicle 100. When the vehicle 100 is turned slightly to the right, such as in a curve on the road 30, a direction of the ACC-target selection range 103 is shifted slightly to the right. Vice versa, when the vehicle 100 is turned slightly to the left, such as in a curve on the road 30, a direction of the ACC-target selection range 103 is shifted slightly to the left. Hereby an ACC efficiently covers the "most interesting" or "most relevant" upcoming field for the vehicle 100 and information on objects and vehicles within this field is provided the ACC 20 such that the velocity of vehicle 100 can be controlled based thereupon. The sensor information within the ACC-target selection range 103 is often relatively confident or reliable.

Since the ACC is restricted to take into account only vehicles etc. within the target selection range 103 it usually has some limitations. A current heading, yaw rate or expected upcoming driving path of the vehicle 100 may differ from an actual upcoming driving path for the vehicle 100. In the situation depicted in FIG. 1 vehicles A and B ahead of the vehicle 100 are missed, since their positions are outside of the ACC-target selection range 103. Vehicles A, B can be missed e.g., if they are positioned ahead of the target selection range 103 and/or if they are laterally displaced relatively the target selection range 103, i.e. at either side of the target selection range 103.

Vehicles A and B are missed, not due to lack of sensor performance, but due to restrictions of the ACC-target selection range 103. The ACC-target selection range 103 is configured to provide information for accelerating or braking the vehicle 100 in a number of ordinary driving situations. An ACC-target selection range 103 may cover e.g., 100-150 meters ahead of the host vehicle. Within this ACC-target selection range 103 sensor information is considered or deemed to be confident and reliable. At larger distances sensor information is considered to be unconfident or unreliable. The target range is therefore selected to be limited to only cover the confident target selection range 103.

However, in a situation where the vehicle 100 is driven with high velocity, for example on a motorway, sometimes also referred to as a freeway, expressway or highway, an ACC 20 using the ACC-target selection range 103 will, in some situations, be incapable to brake the vehicle 100 sufficiently in order to avoid a slow or stationary vehicle ahead since vehicle 100 cannot be decelerated sufficiently fast due to the high velocity of the vehicle 100. The vehicle 100 may then collide with vehicles A and B since vehicles A and B are detected too late for a sufficient braking maneuver due to the restrictions of the ACC-target selection range 103. Also a host vehicle without any ACC may be braked too late to avoid an accident with vehicles A, B ahead, e.g., if a host vehicle driver detects the vehicles A, B too late, or if he does not realize that vehicles A, B are braking until a collision or road departure is unavoidable.

Figure 2A:
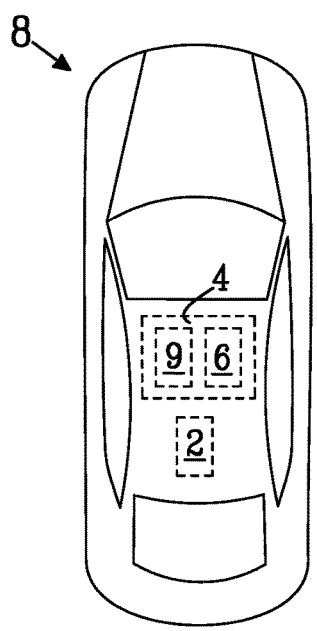
FIGS. 2a and b illustrate a vehicle comprising a vehicle safety assist system according to the present disclosure.

In FIG. 2a, a host vehicle 8 comprising a vehicle safety assist system 6 according to an embodiment of the present disclosure is illustrated. The host vehicle 8 is further depicted comprising a vehicle long range sensor set 9. The vehicle safety assist system 6 is adapted to receive sensor information from the vehicle long range sensor set 9.

In an embodiment of the present disclosure, the host vehicle 8 comprises a vehicle safety assist assembly 4 comprising the vehicle long range sensor set 9 and the vehicle safety assist system 6 according to some embodiments disclosed herein. The vehicle long range sensor set 9 is adapted to be in communication with the vehicle safety assist system 6.

Optionally, the host vehicle 8 may comprise a vehicle safety assist system 6 and/or a vehicle safety assist assembly 4 according to some embodiments disclosed herein.

The host vehicle 8 may also comprise an adaptive cruise control system, ACC, 2, for instance in addition to the above-mentioned vehicle safety assist system 6.

The vehicle long range sensor set 9 comprises at least one long range sensor. The at least one long range sensor can be any type of sensor capable of detecting and/or determining objects, surrounding vehicles etc. at a relatively large distance from the host vehicle 8. In an embodiment the vehicle long range sensor set 9 has a sensing range of at least 200 meters, preferably at least 250 meters. The vehicle long range sensor set 9 can be constituted by one or more camera sensors, one or more radar sensors and/or one or more lidar-sensors. In an embodiment, the vehicle long range sensor set 9 is constituted by sensors of the same sensor type. In some embodiments the long range sensors of the vehicle long range sensor set 9 are configured as an electrical horizon. In some embodiments the long range sensors of the vehicle long range sensor set 9 comprise map-data-sensors, configured to detect upcoming objects, road lanes etc. at least partly based on information retrieved from map data. Such map data can be saved within a memory of the host vehicle 8 or sent to the host vehicle 8.

A camera sensor may be e.g., a front-facing digital camera equipped with or connected to one or more processors with object recognition logics. Hereby surrounding objects, such as the road 30 and any road lanes thereof, other vehicles, traffic signs, pedestrians, animals, different obstacles etc. may be detected and in some cases, identified/classified.

Radar sensors include transmitters that emit signals that bounce back from objects around the host vehicle 8, and receivers that receive the returned signals. The radar sensors may include e.g., ultra-wide band radars, narrow band radars and/or multi node radars. A long range sensor, e.g., of a radar sensor type, can be configured to cover about 250-300 meters ahead of the host vehicle 8. A capacity of the long range sensor can be restricted e.g., due to the limitations in software of the sensor.

Lidar-sensors may measure distances to objects through illuminating the objects with a laser and analyzing the reflected light. The host vehicle 8 can also comprise communication equipment such that the host vehicle 8 is able to communicate with roadside infrastructure, remote servers and similar.

The long range sensor/sensors of the vehicle long range sensor set 9 can be arranged at any position in/on the host vehicle 8 from where detection of a vehicle surrounding is possible, such as at a bumper, a windscreen, a rear view mirror, a grille etc.

Embodiments of the vehicle safety assist system 6 will be described in more detail with reference to FIGS. 2a, 2b, 3a and 3b.

Figure 2B:
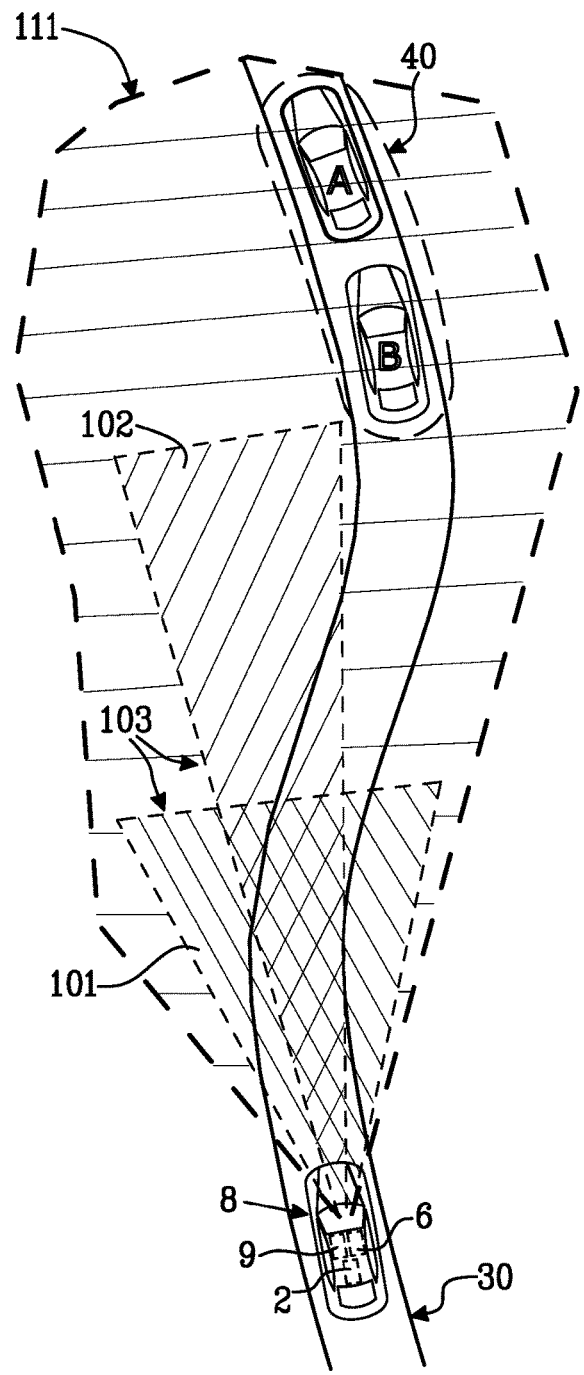

The vehicle safety assist system 6 according to the present disclosure is adapted to receive sensor information about detected vehicles A, B travelling within a sensor coverage area 111 ahead of the host vehicle 8, see FIG. 2b. Thus, the one or long range sensors of the vehicle long range sensor set 9 is/are arranged to determine vehicles A, B travelling ahead of the host vehicle 8 outside the adaptive cruise control system target selection range 103 of the host vehicle 8. The one or more long range sensors of the vehicle long range sensor set 9 can be arranged to determine position, velocity, acceleration, deceleration and/or any other detectable parameter related to the vehicles A, B.

In embodiments herein, the long range sensor or sensors of the vehicle long range sensor set 9 are unrestricted, i.e. they are not restricted to cover a particular section or area. Further, in embodiments described herein the vehicle safety assist system 6 is adapted receive information from the long range sensors 3 in a non-limiting manner, i.e. sensor information relating to any preceding vehicles or similar can be fed to the vehicle safety assist system 6 for initiating braking of the host vehicle 8 and/or issuing a warning signal. The limits for detection are thus defined by the performance or limitations of the long range sensors of the vehicle long range sensor set 9 themselves, not by selected limits of a target selection range 103, limits which depends on the heading or similar of the host vehicle. In FIG. 2b the sensor coverage area is denominated 111. The sensor coverage area 111 is larger than the target selection range 103 and vehicles A, B, which are within the sensor coverage area 111 but outside the target selection range 103, can therefore be detected via the vehicle safety assist system 6 according to embodiments herein. Since the vehicles A, B can be detected earlier than in a system being limited by the target selection range 103, braking of the host vehicle 8 can be initiated earlier, e.g., in a situation where vehicles A, B are decelerating and the host vehicle 8 is approaching at high velocity. Such situation may occur e.g., at an accident site or in the event of a queue on a highway, freeway, motorway or similar.

The vehicle safety assist system 6 according to the present disclosure is adapted to, on the basis of the sensor information, determine a set of detected vehicles 40, which set 40 in FIG. 2b is exemplified as comprising two vehicles A, B. Further, for each vehicle A, B in the set of detected vehicles 40, the vehicle safety assist system 6 is adapted to determine a relative kinematic property between the detected vehicle A, B and the host vehicle 8. The relative kinematic property can be at least one of the following properties: relative distance, relative velocity, relative deceleration and time to collision (TTC). Also, the vehicle safety assist system 6 is adapted to, on the basis of the sensor information, determine a relative kinematic property reliability measure indicative of the reliability of the determined relative kinematic property for each detected vehicle.

The vehicle safety assist system 6 is further adapted to determine a host vehicle impact consequence level CL and a host vehicle impact consequence reliability measure RM indicative of the reliability of the host vehicle impact consequence level CL, on the basis of: host vehicle state information comprising a speed of the host vehicle 8, the number of vehicles in the set of detected vehicles 40, the relative kinematic property and the reliability of the relative kinematic property of each vehicle A, B in the set of detected vehicles 40.

On the basis of at least the host vehicle impact consequence level CL and host vehicle impact consequence reliability measure RM, the vehicle safety assist system 6 is adapted to determine whether or not the vehicle safety assist system 6 should issue a warning signal and/or an autonomous braking signal.

By way of example, the host vehicle impact consequence level CL is mainly attributed to parameters such as the relative kinematic property of each detected vehicle A, B in the detected set of vehicles 40 and the host vehicle speed, whereas the host vehicle impact consequence reliability measure RM is mainly attributed to parameters such as the reliability of the relative kinematic property of each vehicle A, B in the set of detected vehicles 40, as well as the number of vehicles in the set of detected vehicles 40.

In embodiments herein, the vehicle safety assist system 6 is adapted to, on the basis of at least the host vehicle state information and the relative kinematic property of each detected vehicle A, B in the set of detected vehicles 40, determine the host vehicle impact consequence level CL, and on the basis of at least the number of detected vehicles in the set of detected vehicles 40 and the reliability of the relative kinematic property of each vehicle A, B in the set of detected vehicles 40, determine the impact consequence level reliability measure RM.

As such, in some embodiments herein, the host vehicle impact consequence level reliability measure RM increases with an increased number of vehicles in the set of detected vehicles 40.

For example, assume the vehicle safety assist system 6 receives sensor information indicating that a braking vehicle A is detected at a relatively long distance from the host vehicle 8. For instance, the vehicle A may be located outside the ACC target selection range 103 but within the sensor coverage area 111 of the host vehicle. However, due to the long distance, the sensor signal information may be considered weak or unreliable. Now assume a second vehicle B is also detected braking, also at a relatively long distance from the host vehicle 8, again outside the ACC target selection range 103, but within the sensor coverage area 111 of the host vehicle, and due to the long distance the sensor signal information is also considered weak or unreliable. Despite a low reliability in the sensor information for each individual vehicle, the two observations put together increase the probability that a detected vehicle A, B is actually braking. This may be reflected in that the host vehicle impact consequence level reliability measure RM increases with an increased number of vehicles in the set of detected vehicles 40.

Thus, the vehicle safety assist system 6 according to some embodiments herein makes use of unrestricted sensor information and uses the aggregated sensor information for establishing an impact consequence reliability measure RM which takes possibly weak or uncertain sensor information, due to the long detection distance, into account when determining whether or not the system 6 should issue a warning signal and/or an autonomous braking signal.

Purely by way of example, the relative kinematic property reliability measure RM is dependent on the relative distance between the detected vehicle and the host vehicle.

In some embodiments, the vehicle safety assist system 6 is adapted to establish a maximum sensing range of the vehicle long range sensor set 9, wherein the relative kinematic property reliability measure is dependent on the relative distance between the detected vehicle and the host vehicle as well as the maximum sensing range.

With a high host vehicle velocity and/or a relatively short time to collision, the consequence is a possibly severe collision. This may be reflected in that the host vehicle impact consequence level CL increases with an increased speed of the host vehicle 8 and/or a reduced time to collision. Thus, in some embodiments herein, the host vehicle impact consequence level CL increases with a reduced time to collision. In some embodiments, the host vehicle impact consequence level CL increases with an increased speed of the host vehicle 8.

Purely by way of example, the vehicle safety assist system 6 is adapted to correlate the determined host vehicle impact consequence level CL to a range of possible host vehicle impact consequence levels, and further adapted to correlate the determined impact consequence level reliability measure RM to a range of host vehicle impact consequence level reliability measures.

For instance, the vehicle safety assist system 6 may be adapted to establish a range of possible host vehicle impact consequence levels and a host vehicle impact consequence level reliability measure range of possible host vehicle impact consequence levels. The vehicle safety assist system 6 is then adapted to issue an autonomous braking signal for a first combination of a first subrange set of the range of possible host vehicle impact consequence levels and a first subrange set of the host vehicle impact consequence level reliability measure range. The system 6 is further adapted to issue a warning signal for a second combination of a second subrange set of the range of possible host vehicle impact consequence levels and a second subrange set of the host vehicle impact consequence reliability measure range.

Figure 3A:
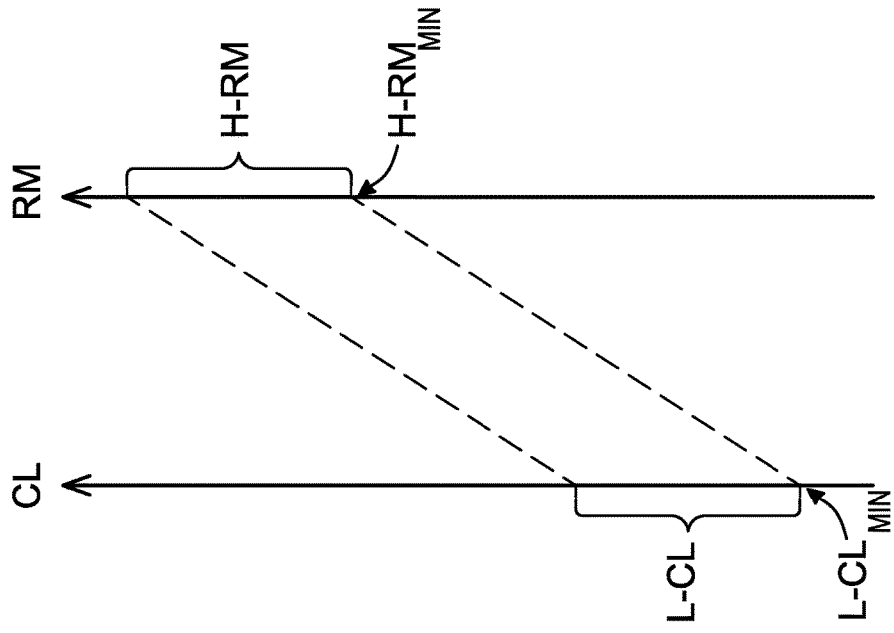
FIGS. 3a and b illustrate examples of subranges that can be used in a vehicle safety assist system.
Figure 3A:
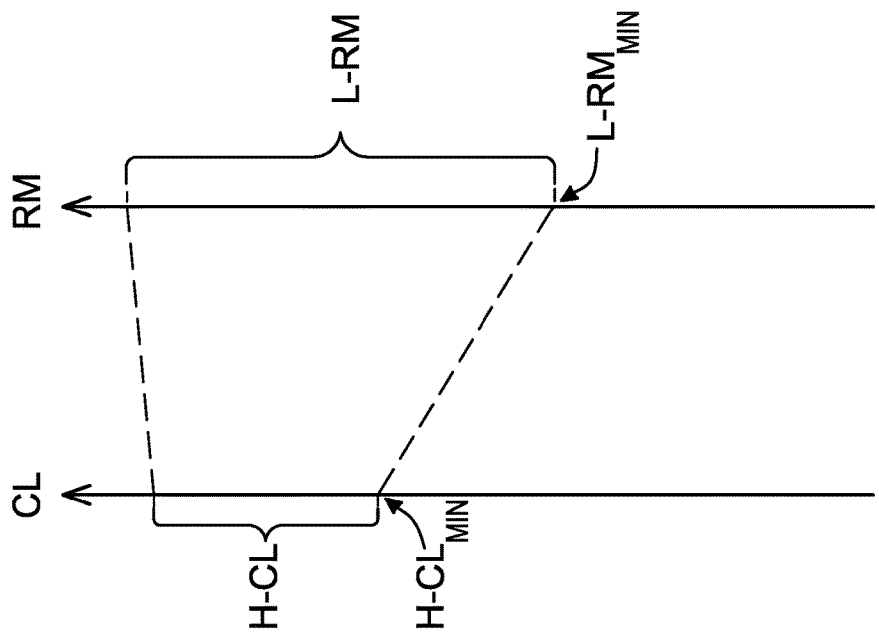
Figure 3B:
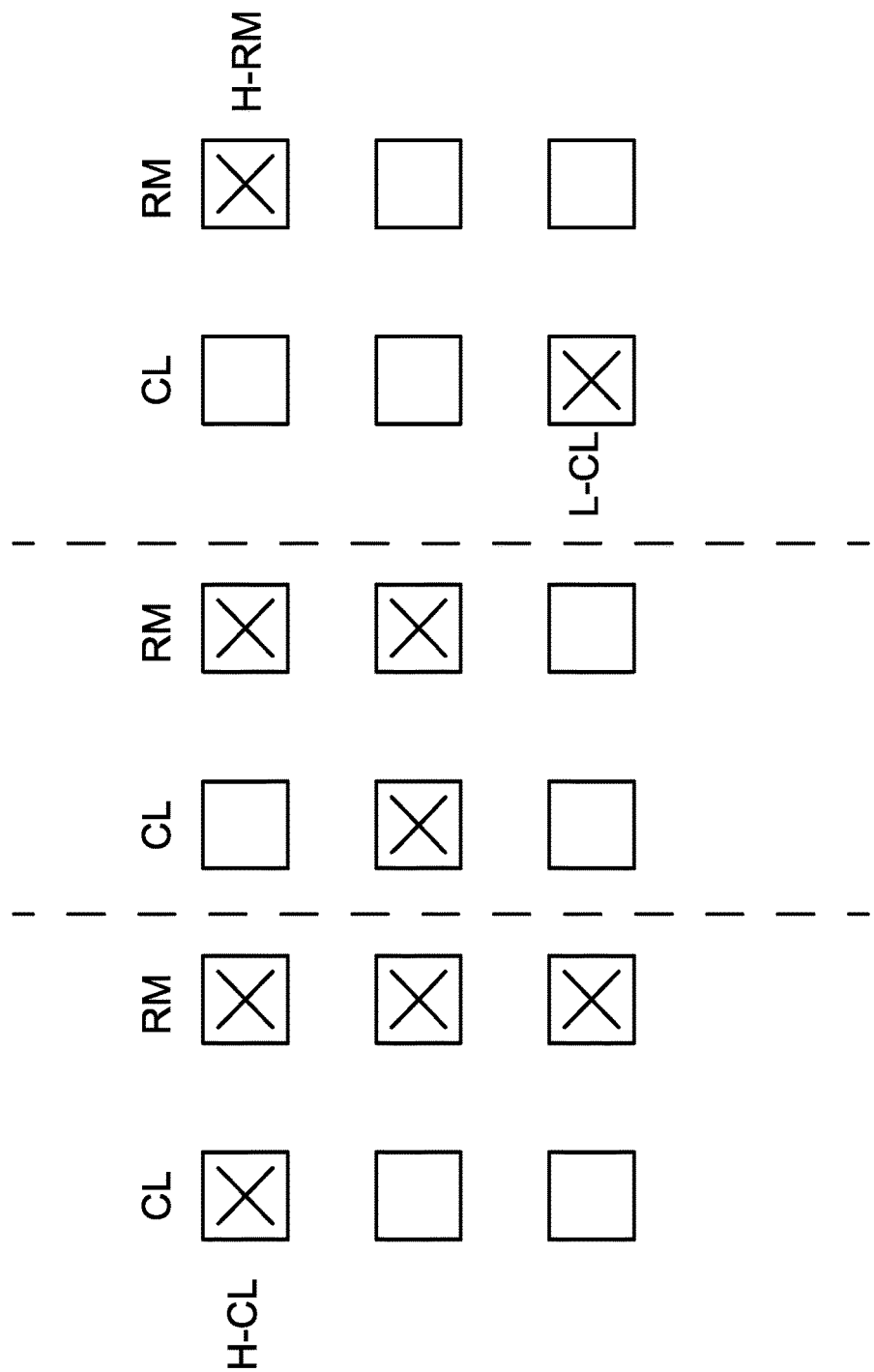

FIGS. 3a and 3b illustrate by way of example the establishing of subrange sets in some embodiments according to the present disclosure. In FIG. 3a a high host vehicle impact consequence level subrange H-CL and a lower host vehicle impact consequence level subrange L-CL of the established host vehicle impact consequence levels are depicted. The high host vehicle impact consequence level subrange H-CL has a minimum host vehicle impact consequence level H-CL$_{MIN}$ that is greater than the minimum host vehicle impact consequence level L-CL$_{MIN}$ of the lower host vehicle impact consequence level subrange L-CL. The high host vehicle impact consequence level subrange H-CL is associated with a low reliability subrange L-RM of the impact consequence level reliability measure range, and the lower host vehicle impact consequence level subrange L-CL is associated with a higher reliability subrange H-RM of the impact consequence level reliability measure range. The low reliability subrange L-RM has a minimum reliability measure L-RM$_{MIN}$ being smaller than the minimum reliability measure H-RM$_{MIN}$ of the higher reliability subrange H-RM.

As a non-limiting example, the vehicle safety assist system 6 may be adapted to establish the first combination of the first subrange set of the range of possible host vehicle impact consequence levels and the first subrange set of the impact consequence level reliability measure range using the high host vehicle impact consequence level subrange, the lower host vehicle impact consequence level subrange, the higher reliability subrange and the low reliability subrange, as are exemplified in FIG. 3a.

Thus, for a high host vehicle impact consequence level subrange, the vehicle safety system may be adapted to issue an autonomous braking signal, even for a relatively low reliability subrange. In other words, for a high host vehicle impact consequence level, implying that the consequence is a possibly severe collision, an autonomous braking signal will be issued by the vehicle safety assist system 6 even if the reliability is low.

Following the same reasoning, for a lower host vehicle impact consequence level subrange, indicating the consequence is a less severe collision, the vehicle safety assist system 6 is adapted to issue an autonomous braking signal only for a higher reliability subrange.

For example, with a high host vehicle velocity the consequence is a possibly severe collision. Therefore, in such a situation, even a relatively low probability of an impact consequence level reliability measure RM suffices for brake initiation of the host vehicle 8. The host vehicle 8 is thus pre-braked in response to the possibly correct, possibly erroneous information on vehicles A, B.

Noticeably, in FIG. 3a, the subranges are indicated as ranges of continuous variables. It should be noted that the scale and/or absolute values for respective subrange sets is not necessarily, or rather are not, the same. Purely by way of example, the scale of ranges may be set to from 0 to 1 or from 0 to 100 percent.

As is illustrated in FIG. 3b, the subranges need not to be of a continuous kind. It is also possible to define the subranges using discrete variables. This is indicated by the box representation in FIG. 3b.

In such a case, the possible host vehicle impact consequence level subranges and impact consequence level reliability measure subranges are represented as a discrete number of alternatives/levels, exemplified in FIG. 3b by three possible levels for the host vehicle impact consequence level and impact consequence level reliability measure, respectively.

As a non-limiting example, a first combination of subrange sets, for which the vehicle safety assist system 6 may issue an autonomous braking signal, may be easily visualized and understood by the checked/ticked boxes depicted in FIG. 3b. Thus, for a high host vehicle impact level subrange H-CL (top box ticked), an autonomous braking signal may be issued even for low reliability, indicated in FIG. 3b by all three boxes for the impact consequence level reliability measure being ticked. Whereas, for a lower host vehicle impact consequence level L-CL, an autonomous braking signal may be issued only for a high reliability, indicated in FIG. 3b by the top box being ticked in the column for the impact consequence reliability measure.

Optionally, in some embodiments herein, the subranges of consequence levels and reliability measures need not to be of the same kind, e.g of continuous or discrete type. By way of example, the subranges of possible host vehicle impact consequence levels may be of a discrete type, whereas the subranges of impact consequence level reliability measure, with which they are combined, may be of continuous kind, and vice versa.

In a similar vein to that laid out hereinabove with reference to FIG. 3a and FIG. 3b, a vehicle safety assist system 6 may be adapted to issue a warning signal for a second combination of a second subrange set of the range of possible host vehicle impact consequence levels and a second subrange set of the impact consequence level reliability measure range. Purely by way of example, the second subrange set of the range of possible host vehicle impact consequence levels and the second subrange set of the impact consequence level reliability measure range may be determined in the same manner as outlined hereinabove. As a non-limiting example, the maximum consequence levels associated with the above-mentioned second combination may be lower than the maximum consequence levels associated with the above-mentioned first combination.

Figure 4:
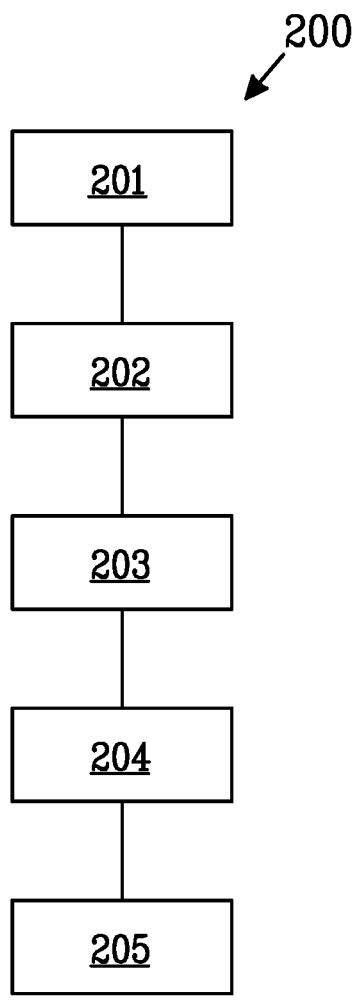
FIG. 4 illustrates a method for determining whether or not to issue a warning signal and/or an autonomous braking signal to a host vehicle.

FIG. 4 illustrates a method 200 for determining whether or not to issue a warning signal and/or an autonomous braking signal to a host vehicle 8.

The method comprises:

receiving 201 sensor information from a vehicle long range sensor set 9 comprising at least one long range sensor, the vehicle long range sensor set 9 being adapted to detect vehicles travelling within a sensor coverage area ahead of the host vehicle 8;

on the basis of the sensor information, determining 202 a set of detected vehicles and, for each detected vehicle, determining a relative kinematic property between the detected vehicle and the host vehicle and also determining a relative kinematic property reliability measure indicative of the reliability of the determined relative kinematic property;

receiving 203 host vehicle state information, the host vehicle state information comprising a speed of the host vehicle;

on the basis of at least the host vehicle state information, the number of vehicles in the set of detected vehicles, the relative kinematic property and the reliability of the relative kinematic property of each vehicle in the set of detected vehicles, determining 204 a host vehicle impact consequence level and an impact consequence level reliability measure indicative of the reliability of the determined host vehicle impact consequence level, and on the basis of at least the host vehicle impact consequence level and the impact consequence level reliability measure, determining 205 whether or not the vehicle safety assist system should issue a warning signal and/or an autonomous braking signal.

Figure 5:
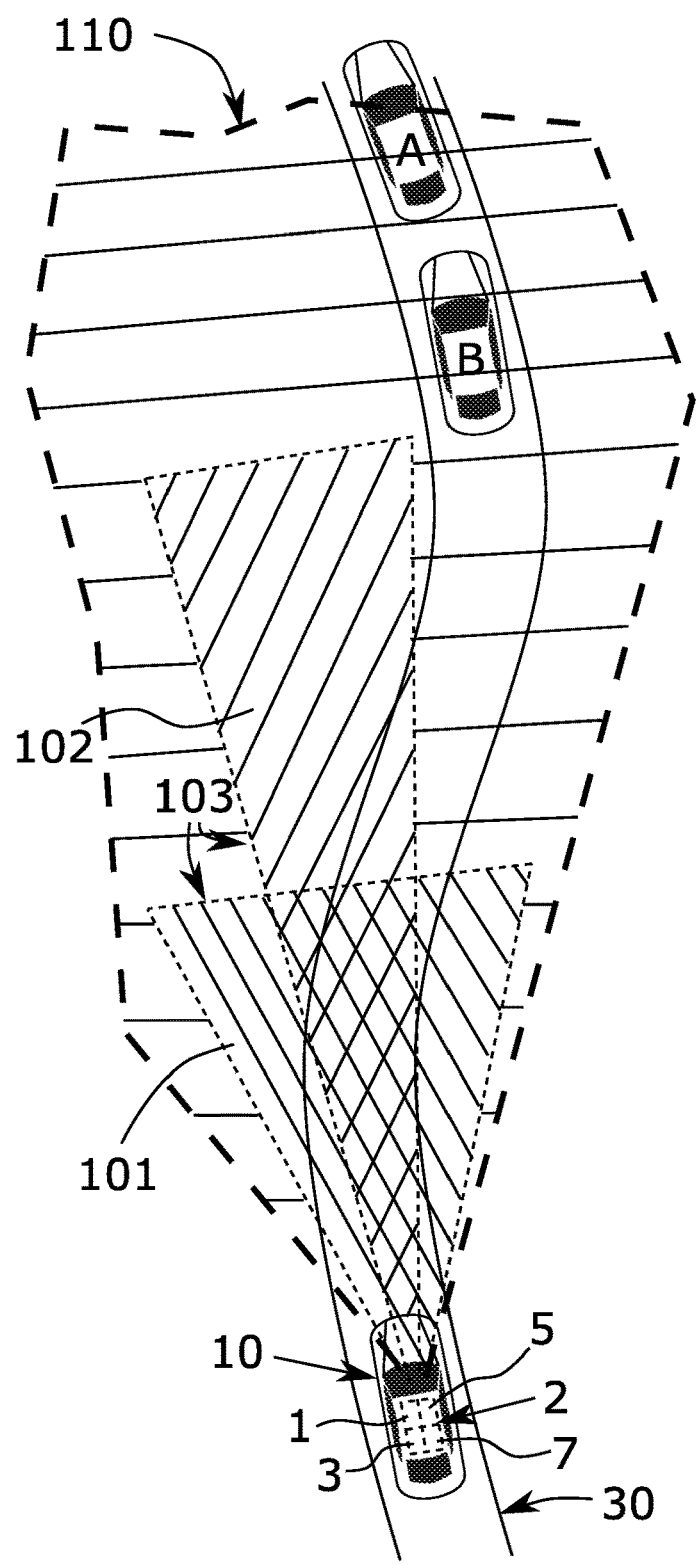
FIG. 5 illustrates a vehicle and a vehicle safety assist system according to some embodiments herein.

In FIG. 5 a host vehicle 10 and a vehicle safety assist system 1 according to some further embodiments herein are illustrated. The host vehicle can also comprise an adaptive cruise control system, ACC, 2.

The vehicle safety assist system 1 comprises one or more long range sensors 3. The one or more long range sensors 3 can be any type of sensor capable to detect and/or determine objects, surrounding vehicles etc. at a relatively large distance from the host vehicle 10. The long range sensors 3 can be one or more camera sensors, one or more radar sensors and/or one or more lidar-sensors. In some embodiments the long range sensors 3 are configured as an electrical horizon. In some embodiments the long range sensors 3 comprise map-data-sensors, configured to detect upcoming objects, road lanes etc. at least partly based on information retrieved from map data. Such map data can be saved within a memory of the host vehicle 10 or sent to the host vehicle.

A camera sensor may be e.g., a front-facing digital camera equipped with or connected to one or more processors with object recognition logics. Hereby surrounding objects, such as the road 30 and any road lanes thereof, other vehicles, traffic signs, pedestrians, animals, different obstacles etc. may be detected and in some cases, identified/classified. Radar sensors include transmitters that emit signals that bounce back from objects around the host vehicle 10, and receivers that receive the returned signals. The radar sensors may include e.g., ultra-wide band radars, narrow band radars and/or multi node radars. A long range sensor 3, e.g., of a radar sensor type, can be configured to cover about 250-300 meters ahead of the host vehicle 10. A capacity of the long range sensor 3 can be restricted e.g., due to the limitations in software of the sensor.

Lidar-sensors may measure distances to objects through illuminating the objects with a laser and analyzing the reflected light. The host vehicle 10 can also comprise communication equipment such that the host vehicle 10 is able to communicate with roadside infrastructure, remote servers and similar.

The long range sensor/sensors 3 can be arranged at any position in/on the host vehicle 10 from where detection of a vehicle surrounding is possible, such as at a bumper, a windscreen, a rear view mirror, a grille etc. In the embodiment illustrated in FIG. 5 one long range sensor 3, in form of a long-range radar sensor, is arranged at the host vehicle 10.

The vehicle safety assist system 1 comprises a sensor information processor 5. The sensor information processor 5 is arranged to process information from the long range sensor(s) 3 and issue instructions based thereupon to a driver warning and brake control system 7. The vehicle safety assist system 1 comprises the driver warning and brake control system 7 and the sensor information processor 5.

In some embodiments the sensor information processor 5 comprises or is connected to one or more processing units. In some embodiments the host vehicle 10 and/or the sensor information processor 5 may comprise a large number of processing units. The one or more processing units may be central processing units that carry out instructions of computer programs/software which when executed perform basic arithmetical, logical, and input/output operations. The host vehicle 10 and/or the sensor information processor 5 may also comprise an accelerated processing unit, APU, also referred to as an advanced processing unit. An APU is a processing unit that includes additional processing capability designed to accelerate one or more types of computations outside of a CPU. One or more processing units may comprise application programming interfaces, APIs, which specify how software components may interact with each other.

The driver warning and brake control system 7 is arranged to selectively provide a driver warning or perform autonomous braking of the host vehicle 10 in response to instructions from the sensor information processor 5. The driver warning and brake control system 7 is capable of braking the host vehicle, e.g., by controlling one or more wheel brakes to be activated. The driver warning and brake control system 7 can comprise or be connected to a vehicle brake system comprising drum-brakes, disc-brakes or equivalent. The driver warning and brake control system 7 is also arranged to generate an alert into a driver/passenger compartment of the host vehicle 10. Such an alert can be e.g., an audio-alert, a haptic alert and/or a visual alert.

The one or more long range sensors 3 is/are arranged to determine vehicles A, B travelling ahead of the host vehicle 10 outside the adaptive cruise control system target selection range 103 of the host vehicle 10. The one or more long range sensors 3 can be arranged to determine position, velocity, acceleration, deceleration and/or any other detectable parameter related to the vehicles A, B.

The sensor information processor 5 is arranged to determine, from host vehicle velocity sensor data, if the host vehicle 10 is travelling above at least one predetermined threshold velocity. Information relating to host vehicle velocity, deceleration, acceleration or any other available host vehicle drive-related parameter can be received e.g., from the ACC or any other suitable host vehicle sensor, system or processor. The sensor information processor 5 is also arranged to determine if a relative deceleration of at least one determined vehicle A, B travelling ahead of the host vehicle 10 is above at least one predetermined threshold deceleration. Thus, the sensor information processor 5 is arranged to compare or evaluate a deceleration of one or more determined vehicles A, B with a velocity or deceleration of the host vehicle 10. Hereby the sensor information processor 5, among other things, can determine how much the host vehicle has to be decelerated in order to not catch up and collide with the determined vehicles A, B.

The sensor information processor 5 is also arranged to determine the strength or confidence of the determination/detection of the determined vehicles A, B. Thus, the sensor information processor 5 is arranged to calculate or estimate the probability that the information on the determined vehicles is correct or reliable. The strength or confidence can be determined, measured and/or estimated e.g., by consideration of one or more of the following: signal strength, signal quality, signal delay, duration/number of signals, signal package loss, signal-to-interference-ratio, signal-to-noise-ratio, bit-error-rate, block-error-rate.

The driver warning and brake control system 7 is arranged to provide a driver warning or perform autonomous braking of the host vehicle 10 in response to instructions from the sensor information processor 5 based on the determinations of vehicles ahead, host vehicle velocity, relative deceleration and the strength/confidence of these determinations.

In embodiments herein, the long range sensor or sensors 3 are unrestricted, i.e. they are not restricted to cover a particular section or area. Further, in embodiments described herein the sensor information processor 5 is arranged to process information from the long range sensors 3 in a non-limiting manner, i.e. sensor information relating to any preceding vehicles or similar can be used for initiating braking of the host vehicle 10. The limits for detection are thus defined by the performance or limitations of the long range sensors 3 themselves, not by selected borders of a target selection range 103, borders which depends on the heading or similar of the host vehicle. In FIG. 5 the sensor coverage area is denominated 110. The sensor coverage area 110 is larger than the target selection range 103 and vehicles A, B, which are within the sensor coverage area 110 but outside the target selection range 103, can therefore be detected/determined via the vehicle safety assist system 1 according to embodiments herein. Since the vehicles A, B can be detected earlier, braking of the host vehicle 10 can be initiated earlier, e.g., in a situation where vehicles A, B are decelerating and the host vehicle 10 is approaching at high velocity. Such situation may occur e.g., at an accident site or in the event of a queue on a highway, freeway, motorway or similar.

Figure 6:
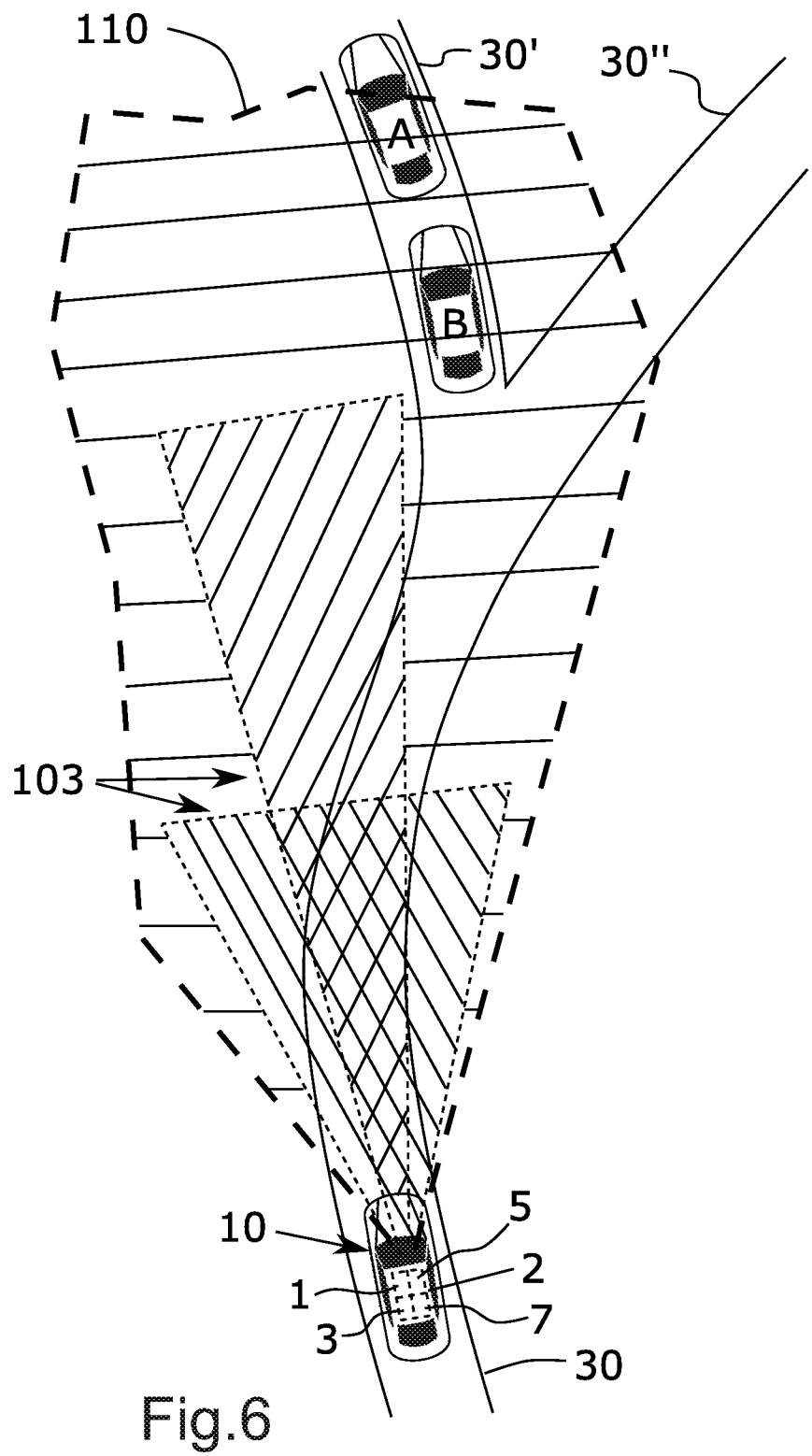
FIG. 6 illustrates a vehicle and a vehicle safety assist system according to some further embodiments herein.

FIG. 6 illustrates a scenario in which a host vehicle 10 comprising a vehicle safety assist system 1 according to some embodiments is driven on a road 30. The vehicle assist system 1 comprises one or more long range sensors 3, a sensor information processor 5 and a driver warning and brake control system 7. An ACC 2 of the host vehicle 10 has a target selection range 103 and the long range sensors 3 have a sensor coverage area 110.

The vehicle safety assist system 1 and its functions will be explained with the below examples;

EXAMPLE 1

The host vehicle 10 is travelling above at least one predetermined threshold velocity. Such at least one predetermined threshold velocity can be e.g., about 110 km/h, 130 km/h or 150 km/h. The long range sensor 3 determines that one or more vehicles A, B are braking. A reason for such a braking can be a queue on the road ahead, an accident or the like. The vehicles A, B are at a relatively long distance from the host vehicle 10, such as at about 250-300 meters ahead of the host vehicle 10. They are therefore still outside the ACC-target selection range 103. They are, however, within the sensor coverage area 110 of the host vehicle 10, but due to the long distance the signal with information on vehicles A, B may be considered to be weak or unreliable. Since the host vehicle 10 is driven above the at least one predetermined threshold velocity the host vehicle 10 is braked and/or a driver alert is initiated. The host vehicle 10 is thus decelerated or pre-braked in response to the possibly correct, possibly erroneous information on vehicles A, B.

The consequence of a collision between the host vehicle 10 and a vehicle B ahead is balanced against a probability that a vehicle B ahead of the host vehicle 10 actually is decelerating. With a high host vehicle velocity the consequence is a possibly severe collision. Therefor a relatively low probability of a decelerating vehicle ahead suffices for brake initiation of the host vehicle 10.

If the velocity of the host vehicle 10 had been lower, i.e. below at least one predetermined threshold velocity, brake initiation could have been postponed since the possible consequences of a collision would have been less severe due to the lower relative velocity between the host vehicle 10 and the vehicle B ahead. In such a situation an ACC can be used for controlling the host vehicle velocity when the host vehicle 10 is closer to the vehicle ahead and when the vehicle ahead is within the adaptive cruise control system target selection range 103.

Generally, an ACC is configured to decelerate a vehicle at about 1-5 m/s2 during normal operation, since decelerations exceeding 4-5 m/s2 may be perceived as uncomfortable by vehicle occupants. The vehicle safety assist system 1 according to embodiments described herein is arranged to brake the host vehicle 10 as hard as possible in order to avoid collisions with vehicles ahead of the host vehicle. In a relatively modern vehicle, with efficient brakes, the vehicle safety assist system 1 is able to decelerate the host vehicle at about 1-12 m/s2. In some embodiments the vehicle safety assist system 1 is arranged to decelerate the host vehicle 10 with a deceleration exceeding 6 m/s2. In some embodiments the vehicle safety assist system 1 is arranged to decelerate the host vehicle 10 with a deceleration exceeding 8 m/s2.

A focus for the vehicle safety assist system 1, as described herein, is to avoid or mitigate rear-end collisions between a host vehicle 10 driving at a high or very high velocity and a preceding vehicle which is braking or stopping because of a queue on a motorway or similar. The safety assist system 1 can therefore alternatively be referred to as an emergency brake assist system, a secondary brake assist system or similar.

EXAMPLE 2

The host vehicle 10 is travelling above at least one predetermined threshold velocity. Such at least one predetermined threshold velocity can be e.g., about 100 km/h, 120 km/h, 140 km/h or 160 km/h. The long range sensor 3 determines that one or more vehicles A, B ahead are braking. The vehicles A, B are at a relatively long distance from the host vehicle 10, such as at 250-300 meters ahead of the host vehicle 10. They are outside the system target selection range 103 taken into account by the ACC. They are within the sensor coverage area 110 of the host vehicle 10, but due to the large distance the signal with information on vehicles A, B may be considered to be weak or unreliable.

The driver warning and brake control system 7 is arranged to provide a driver warning or perform autonomous braking if only a first upcoming driving lane 30' for the host vehicle 10 is available. Thus, in a situation or scenario where only the upcoming driving lane 30', and not a second upcoming driving lane 30" is present ahead, the driver warning and brake control system 7 is arranged to provide a driver warning or perform autonomous braking. If only one upcoming driving lane 30' is available an early driver warning and/or braking can be of greater importance than if two or more upcoming driving lanes 30', 30" are available, since the host vehicle 10 possibly can avoid a collision not only by braking but also by selecting an upcoming driving lane 30', 30" in which no ahead vehicles A, B are positioned. With only one upcoming driving lane this option is not available.

In some embodiments the driver warning and brake control system 7 is arranged to postpone a driver warning or autonomous braking if a number of available upcoming driving lanes 30', 30" for the host vehicle is at least a threshold number of lanes. The threshold number of lanes can be e.g., one, two or three lanes.

Information on lanes can be achieved e.g., by sensor data, by detection of lanes ahead, by detection of vehicle positions ahead, and/or by map data stored in the vehicle or received from a map data base.

EXAMPLE 3

Figure 7:
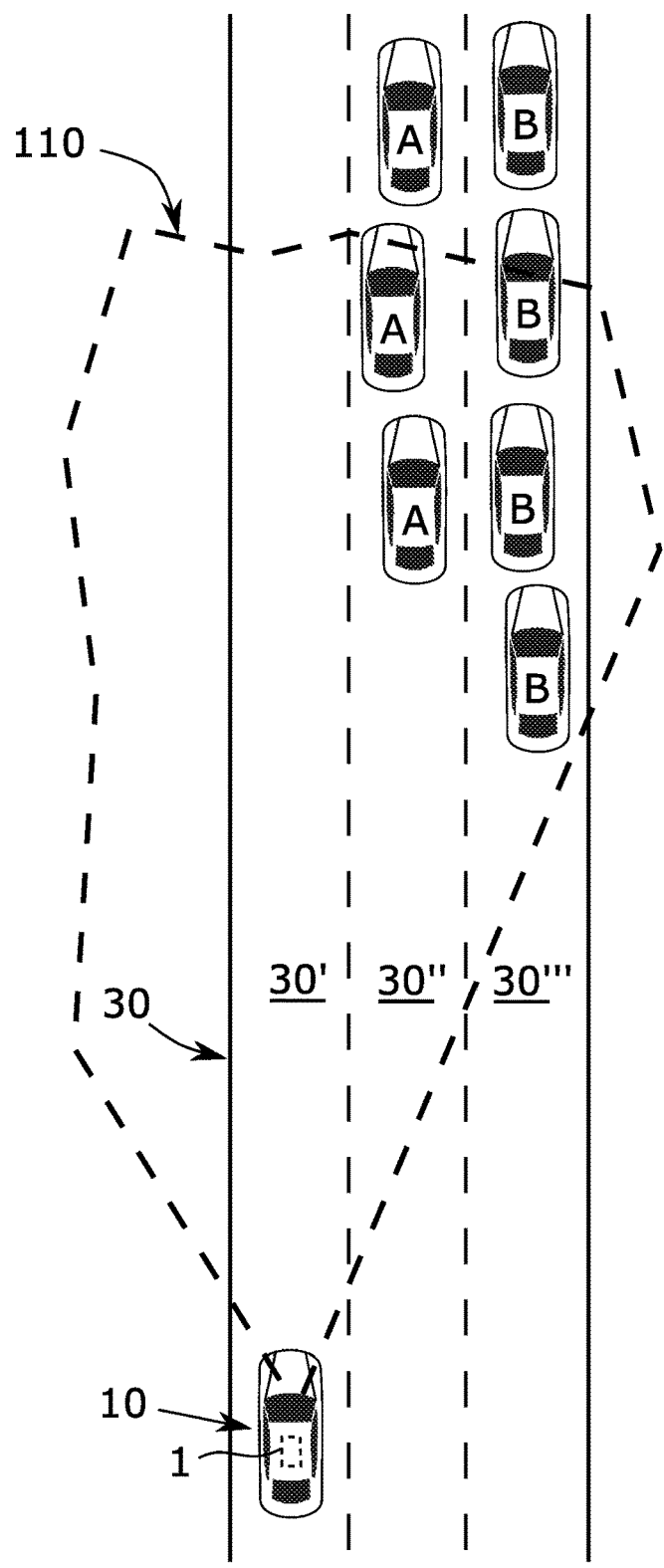
FIG. 7 illustrates a vehicle and a vehicle safety assist system according to yet further embodiments herein.

The host vehicle 10 is driven on a road 30 as illustrated in FIG. 7. The host vehicle 10 comprises a vehicle safety assist system 1 with a processor, long range sensor and driver warning and brake control system as described above.

The road 30 has three upcoming road lanes, 30', 30" and 30'''. The host vehicle is driven at high velocity in the left lane 30'. The vehicle safety assist system 1 determines that vehicles A, B ahead are decelerating.

At this stage, an ACC or similar system has difficulties to determine if a vehicle is present ahead. If a vehicle ahead is detected, the ACC or similar system cannot determine within which road lane an object or vehicle ahead is positioned with high confidence or precision. As mentioned above, an ACC typically covers an upcoming distance of below 150-200 meters from the host vehicle.

The vehicle safety assist system 1 determines if a relative deceleration of the vehicle A, B travelling ahead of the host vehicle 10 is above at least one predetermined threshold deceleration. For example, if the host vehicle 10 is driven at 120 km/h and the vehicles A, B have a current velocity of about 20 km/h and/or a deceleration of about 6 m/s2 the vehicle safety assist system 1 will brake the host vehicle 10. The host vehicle 10 can be braked also if no information on ahead vehicles within the first lane 30' is available. Hereby it is avoided that the host vehicle 10 in the first lane 30' passes stationary or slowly driven vehicles A, B in the second 30' and third 30" lane with a high relative velocity. This braking or pre-braking can also be referred to as precautionary braking, since the host vehicle is braked "just in case" when it is determined that consequences of a collision may be severe. Accidents caused by a vehicle A which suddenly shift lane in front of the host vehicle 10, from the second lane 30" to the first lane 30', can hereby be avoided. Further, a vehicle ahead can be present in the lane 30' but be positioned outside or ahead of the sensor coverage area 110. This can occur e.g., in a queue-scenario or similar, when vehicles can shift driving lanes with short notice in order to position itself in a road lane with the shortest queue.

Figure 8:
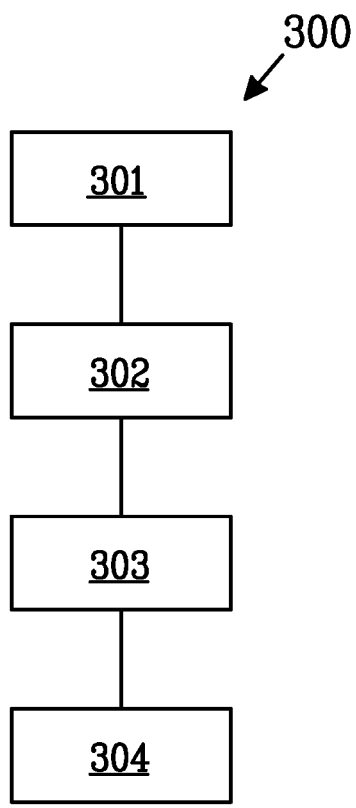
FIG. 8 illustrates a method for providing a driver warning or performing autonomous braking of a host vehicle according to some embodiments herein.

FIG. 8 illustrates a method 100 for providing a driver warning or performing autonomous braking of a host vehicle comprising an adaptive cruise control system and a vehicle safety assist system, the vehicle safety assist system comprising: one or more long range sensors arranged to determine vehicles travelling ahead of the host vehicle; a sensor information processor arranged to process sensor information and issue instructions based thereupon and a driver warning and brake control system arranged to selectively provide a driver warning or perform autonomous braking in response to instructions from the sensor information processor.

The method 100 comprises: Determining 101, by the one or more long range sensors vehicles travelling ahead of the host vehicle outside an adaptive cruise control system target selection range of the host vehicle. Determining 102, based on information from host vehicle velocity sensor data, if the host vehicle is travelling above at least one predetermined threshold velocity. Determining 103, by the sensor information processor, if a relative deceleration of at least one determined vehicle travelling ahead of the host vehicle is above at least one predetermined threshold deceleration and to determine the strength or confidence of this determination. Providing 104 a driver warning or performing autonomous braking, by the driver warning and brake control system, in response to instructions from the sensor information processor based on the above determinations.

In some embodiments the host vehicle 10 has autonomous capabilities and may then be referred to as an autonomous or semi-autonomous vehicle. The host vehicle 10 is then capable of driving autonomously, i.e. without steering- accelerating- or braking input from a vehicle operator. Sensors of the host vehicle 10 can continuously monitor the vehicle surrounding. The sensors can detect e.g., road lanes, surrounding traffic and various obstacles on- or in the vicinity of the road. The sensors may detect distance and direction to other vehicles, pedestrians, bicycles etc. The host vehicle 10 can also comprise communication equipment, such that road and/or traffic information may be sent to the host vehicle 10. The host vehicle 10 can comprise a drive arrangement which can control drive functions, such as steering, accelerating, braking etc. as a function of the information received from the sensors and/or information sent to the host vehicle 10. Hereby the host vehicle 10 can drive autonomously along at least some road sections within a road network.

What is claimed is:

1. A vehicle safety assist system for a host vehicle, the vehicle safety assist system configured to:
receive sensor information from a vehicle long range sensor set comprising at least one long range sensor, the vehicle long range sensor set being adapted to detect vehicles travelling within a sensor coverage area ahead of the host vehicle;
on the basis of the sensor information, determine a set of detected vehicles and, for each detected vehicle, determine a relative kinematic property between the detected vehicle and the host vehicle and also determine a relative kinematic property reliability measure indicative of a reliability of the determined relative kinematic property;
receive host vehicle state information, the host vehicle state information comprising a speed of the host vehicle;
on the basis of at least the host vehicle state information, a number of vehicles in the set of detected vehicles, the relative kinematic property and the reliability of the relative kinematic property of each vehicle in the set of detected vehicles, determine a host vehicle impact consequence level and an impact consequence level reliability measure indicative of a reliability of the determined host vehicle impact consequence level; and
on the basis of at least the host vehicle impact consequence level and the impact consequence level reliability measure, determine whether the vehicle safety assist system should issue a warning signal and/or an autonomous braking signal.

2. The vehicle safety assist system according to claim 1 wherein the system is adapted to: on the basis of at least the host vehicle state information and the relative kinematic property of each detected vehicle in the set of detected vehicles, determine the host vehicle impact consequence level, and on the basis of at least the number of detected vehicles in the set of detected vehicles and the reliability of the relative kinematic property of each vehicle in the set of detected vehicles, determine the impact consequence level reliability measure.

3. The vehicle safety assist system according to claim 1 wherein the relative kinematic property comprises at least one of the following properties: relative distance, relative velocity, relative deceleration and time to collision.

4. The vehicle safety assist system according to claim 1 wherein the impact consequence level reliability measure increases with an increased number of vehicles in the set of detected vehicles.

5. The vehicle safety assist system according to claim 1 wherein the relative kinematic property reliability measure is dependent on the relative distance between the detected vehicle and the host vehicle.

6. The vehicle safety assist system according to claim 5 wherein the vehicle safety assist system is adapted to establish a maximum sensing range of the vehicle long range sensor set, the relative kinematic property reliability measure being dependent on the relative distance and the maximum sensing range.

7. The vehicle safety assist system according to claim 1 wherein the host vehicle impact consequence level increases with a reduced time to collision.

8. The vehicle safety assist system according to claim 1 wherein the host vehicle impact consequence level increases with an increased speed of the host vehicle.

9. The vehicle safety assist system according to claim 1 wherein the vehicle safety assist system is adapted to establish a range of possible host vehicle impact consequence levels, the vehicle safety assist system further being adapted to establish an impact consequence level reliability measure range of possible host vehicle impact consequence levels, the vehicle safety assist system being adapted to
issue the autonomous braking signal for a first combination of a first subrange set of the range of possible host vehicle impact consequence levels and a first subrange set of the impact consequence level reliability measure range, and
issue the warning signal for a second combination of a second subrange set of the range of possible host vehicle impact consequence levels and a second subrange set of the impact consequence level reliability measure range.

10. The vehicle safety assist system according to claim 9 wherein the vehicle safety assist system is adapted to establish each one of a high host vehicle impact consequence level subrange and a lower host vehicle impact consequence level subrange of the host vehicle impact consequence levels, the high host vehicle impact consequence level subrange having a minimum host vehicle impact consequence level being greater than a minimum host vehicle impact consequence level of the lower host vehicle impact consequence level subrange, the vehicle safety assist system further being adapted to associate the high host vehicle impact consequence level subrange to a low reliability subrange of the impact consequence level reliability measure range and to associate the lower host vehicle impact consequence level subrange to a higher reliability subrange of the impact consequence level reliability measure range, the low reliability subrange having a minimum reliability measure smaller than a minimum reliability measure of the higher reliability subrange.

11. The vehicle safety assist system according to claim 10 wherein the vehicle safety assist system is adapted to establish the first combination of the first subrange set of the range of possible host vehicle impact consequence levels and the first subrange set of the impact consequence level reliability measure range using the high host vehicle impact consequence level subrange, the lower host vehicle impact consequence level subrange, the higher reliability subrange and the low reliability subrange.

12. The vehicle safety assist system according to claim 9 wherein the vehicle safety assist system is adapted to correlate the determined host vehicle impact consequence level to the range of possible host vehicle impact consequence levels, the vehicle safety assist system further being adapted to correlate the determined impact consequence level reliability measure to the range of impact consequence level reliability measures.

13. The vehicle safety assist system according to claim 1 wherein the vehicle long range sensor set comprises sensors of the same sensor type.

14. The vehicle safety assist system according to claim 1 wherein the vehicle long range sensor set has a sensing range of at least 200 meters.

15. A vehicle safety assist assembly comprising a vehicle long range sensor set and a vehicle safety assist system according to claim 1, the vehicle long range sensor set being adapted to communicate with the vehicle safety assist system.

16. A vehicle comprising a vehicle safety assist system according to claim 1.

17. A method for determining whether to issue a warning signal and/or an autonomous braking signal to a host vehicle, the method comprising:
receiving sensor information from a vehicle long range sensor set comprising at least one long range sensor, the vehicle long range sensor set being adapted to detect vehicles travelling within a sensor coverage area ahead of the host vehicle;
on the basis of the sensor information, determining a set of detected vehicles and, for each detected vehicle, determining a relative kinematic property between the detected vehicle and the host vehicle and also determining a relative kinematic property reliability measure indicative of a reliability of the determined relative kinematic property;
receiving host vehicle state information, the host vehicle state information comprising a speed of the host vehicle;
on the basis of at least the host vehicle state information, a number of vehicles in the set of detected vehicles, the relative kinematic property and the reliability of the relative kinematic property of each vehicle in the set of detected vehicles, determining a host vehicle impact consequence level and an impact consequence level reliability measure indicative of a reliability of the determined host vehicle impact consequence level; and
on the basis of at least the host vehicle impact consequence level and the impact consequence level reliability measure, determining whether a vehicle safety assist system should issue a warning signal and/or an autonomous braking signal.

18. A vehicle safety assist system for a host vehicle, the vehicle safety assist system comprising:
one or more long range sensors configured to determine vehicles travelling within a sensor coverage area ahead of the host vehicle;
a sensor information processor configured to process sensor information and issue instructions based thereon, the sensor information processor configured to determine, from host vehicle velocity sensor data, if the host vehicle is travelling above at least one predetermined threshold velocity, to determine if a relative deceleration of at least one determined vehicle travelling ahead of the host vehicle is above at least one predetermined threshold deceleration, and to determine a strength or confidence of the determined relative deceleration; and
a driver warning and brake control system configured to selectively provide a driver warning or perform autonomous braking in response to instructions from the sensor information processor based on sensor information processor determinations.

19. The vehicle safety assist system according to claim 18 wherein the driver warning and brake control system is configured to provide a driver warning or perform autonomous braking if the strength or confidence of the determined relative deceleration of at least one determined vehicle travelling ahead of the host vehicle is below a threshold strength or confidence.

20. The vehicle safety assist system according to claim 18 wherein the driver warning and brake control system is configured to postpone a driver warning or autonomous braking until the strength or confidence of the relative deceleration determination reaches a threshold strength or confidence.

21. The vehicle safety assist system according to claim 18 wherein the driver warning and brake control system is configured to provide a driver warning or perform autonomous braking if a number of available upcoming driving lanes for the host vehicle is below a threshold number of lanes.

22. The vehicle safety assist system according to claim 18 wherein the driver warning and brake control system is configured to postpone a driver warning or autonomous braking if a number of available upcoming driving lanes for the host vehicle is at least a threshold number of lanes.

23. The vehicle safety assist system according to claim 18 wherein the sensor information processor is configured to determine a probability that the host vehicle and a determined vehicle ahead of the host vehicle will become positioned within a predetermined distance from each other and to control the driver warning and brake control system to provide a driver warning or perform autonomous braking in response to the determined probability.

24. A vehicle comprising a vehicle safety assist system according to claim 18.

25. A method for providing a driver warning or performing autonomous braking of a host vehicle comprising a vehicle safety assist system, the vehicle safety assist system including one or more long range sensors configured to determine vehicles travelling ahead of the host vehicle, a sensor information processor configured to process sensor information and issue instructions based thereupon, and a driver warning and brake control system configured to selectively provide a driver warning or perform autonomous braking in response to instructions from the sensor information processor, the method comprising:
(a) determining, by the one or more long range sensors vehicles travelling within a sensor coverage area ahead of the host vehicle;
(b) determining, based on information from host vehicle velocity sensor data, if the host vehicle is travelling above at least one predetermined threshold velocity;
(c) determining, by the sensor information processor, if a relative deceleration of at least one determined vehicle travelling ahead of the host vehicle is above at least one predetermined threshold deceleration and a strength or confidence of the determined relative deceleration; and
(d) providing a driver warning or performing autonomous braking, by the driver warning and brake control system, in response to instructions from the sensor information processor based on at least (c).

* * * * *